(12) United States Patent
Bordenet et al.

(10) Patent No.: US 10,055,494 B1
(45) Date of Patent: Aug. 21, 2018

(54) VISUALIZATION OF PLOTLINES

(71) Applicant: Amazon Technologies, Inc., Reno, NV (US)

(72) Inventors: Matthew James Bordenet, Sammamish, WA (US); Yann Thierry Oehl, Seattle, WA (US); Charles Benjamin Franklin Waggoner, Portland, OR (US); Hilliard Bruce Siegel, Seattle, WA (US); Scott Thomas Moran, Seattle, WA (US); Tanya Salyers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1032 days.

(21) Appl. No.: 14/309,643

(22) Filed: Jun. 19, 2014

(51) Int. Cl.
*G06F 3/048* (2013.01)
*G06F 17/30* (2006.01)
*G06F 3/0484* (2013.01)

(52) U.S. Cl.
CPC ........ *G06F 17/3084* (2013.01); *G06F 3/0484* (2013.01)

(58) Field of Classification Search
CPC ............ G06F 17/212; G06F 17/30554; G06F 17/30817; G06F 3/0481; G06F 3/04842
See application file for complete search history.

(56) References Cited

U.S. PATENT DOCUMENTS

| | | | |
|---|---|---|---|
| 8,131,552 B1 * | 3/2012 | Gibbon | G06F 17/30787 704/246 |
| 8,229,287 B1 * | 7/2012 | Duggal | H04N 5/76 386/343 |
| 8,566,315 B1 * | 10/2013 | Davtchev | G06F 17/30817 707/736 |
| 2006/0225088 A1 * | 10/2006 | Gutta | H04H 60/372 725/14 |
| 2010/0043030 A1 * | 2/2010 | White | G11B 27/105 725/58 |
| 2010/0287475 A1 * | 11/2010 | van Zwol | G06F 3/04817 715/723 |
| 2011/0113333 A1 * | 5/2011 | Lee | H04M 1/72525 715/716 |
| 2011/0161820 A1 * | 6/2011 | Lee | G06F 17/30038 715/723 |
| 2012/0005209 A1 * | 1/2012 | Rinearson | G06F 17/30908 707/737 |
| 2013/0198642 A1 * | 8/2013 | Carney | G06F 3/0484 715/738 |

(Continued)

*Primary Examiner* — Mahelet Shiberou
(74) *Attorney, Agent, or Firm* — Thorpe North & Western LLP

(57) ABSTRACT

A technology is described for providing plotline information associated with media content. An example method may include receiving a request from a customer via an interface for plotline information stored on a data store. The plotline information may be included in media content where the plotline information may include a plurality of plotlines featured in the narrative of the media content. The plotline information may then be identified in the data store, and a graphical visualization of the plotline information included in the media content may be generated, where the graphical visualization may display the plotline information as corresponding to the narrative of the media content.

20 Claims, 12 Drawing Sheets

(56) References Cited

U.S. PATENT DOCUMENTS

2013/0283317 A1* 10/2013 Guntupalli ......... H04N 21/4147
                                                                725/44
2016/0110046 A1* 4/2016 Yao ....................... G06F 3/0485
                                                                715/784

\* cited by examiner (1) Reflecting a customer's history up to Book 1 Chapter 2

(2) Reflecting the customer's history up to Book 2 Chapter 4

Jenny's List of Favorite Plotlines 1002

| # | Title 1004 | Ratings |
|---|---|---|
| 1 | BREAKING DEPRAVED | |
| | 1010→ William learns he has cancer | 8.6 ← 1008 |
| | Henry gets a promotion | 6.4 |
| 2 | ALPHA DWELLING | |
| | Mr. Biggs goes to Washington | 6.8 |
| | Robert flexes seniority | 5.7 |
| | Adriana forms a super PAC | 7.7 |
| | Mr. Laffer rents his house out | 8.5 |
| 3 | SEE-THROUGH | |
| | Jeffery attempts to hide secret | 6.3 |
| | Gaby and Jay reveal secrets | 7.7 |
| | Family attempts reconciliation | 8.6 |

VISUALIZATION OF PLOTLINES

BACKGROUND

A narrative may be presented using various forms of media. For example, a narrative may be presented using a digital video recording, an audio recording and/or an electronic book. Digital media can be stored on individual client devices or on data stores that are accessible over a network, sometimes referred to as server storage. Using a client device, a customer can evaluate digital media and consume a narrative presented as a movie, television program, network streaming video, audio book or electronic book. As an illustration, a video program series may be transmitted over the Internet from a data store to a client device upon which a customer may view the video program series.

In general, narratives include a main theme or plotline and a number of subplots that may be distributed throughout the narrative. For example, a subplot may be a secondary strand of the main plot that is a supporting side story of the main plotline. A subplot may connect to the main plotline, in either time, place or in thematic significance. A narrative may be divided into a number of segments that together comprise a series. For example, a television series may be a narrative work that is divided into one or more seasons, where each season may include multiple episodes. A main plotline of a narrative work may span an entire series and subplots included in the narrative work may span multiple seasons or episodes. In some situations plotlines may start and end in different types of media, for example, a sub-plot may start in a digital video recording and then branch off into an electronic book or audio recording.

BRIEF DESCRIPTION OF THE DRAWINGS

FIG. 10 is a diagram illustrating an example graphical user interface used to display a listing of favorite plotlines selected by a customer.

DETAILED DESCRIPTION

A technology is described for organizing plotline information contained in media content, such as a television program series, video series, electronic book series, audio book series or other media content with plots and presenting the plotline information within a graphical visualization. In one example configuration, plotline information may be generated for a number of plotlines included in a narrative featured in media content. The plotline information may include information that describes one or more plotlines, such as a title or description that identifies a plotline, a summary of the plotline, locations within an associated narrative where the plotline occurs, as well as other information related to the plotline. The plotline information may be indexed by media content title(s), episodes or other media content subdivisions and stored in a data store from which the plotline information may be retrieved in response to a request for the plotline information.

A graphical visualization of plotline information for media content may be generated by retrieving plotline information from the data store and organizing the plotline information so that the plotline information is associated with seasons, episodes, chapters, sections, events or other media content subdivisions in which an associated plotline occurs. In one example, a plotline may be displayed on a client device where a graphical visualization shows media content as a segmented timeline of, for example, episodes and seasons that comprise the media content. The plotline may be displayed within a segmented timeline as corresponding to episodes and seasons that feature the plotline. In another example, a plotline visualization may be displayed as a listing of plotlines corresponding to a narrative timeline of seasons, episodes, chapters, sections or events in which a plotline may be featured.

Figure 1:
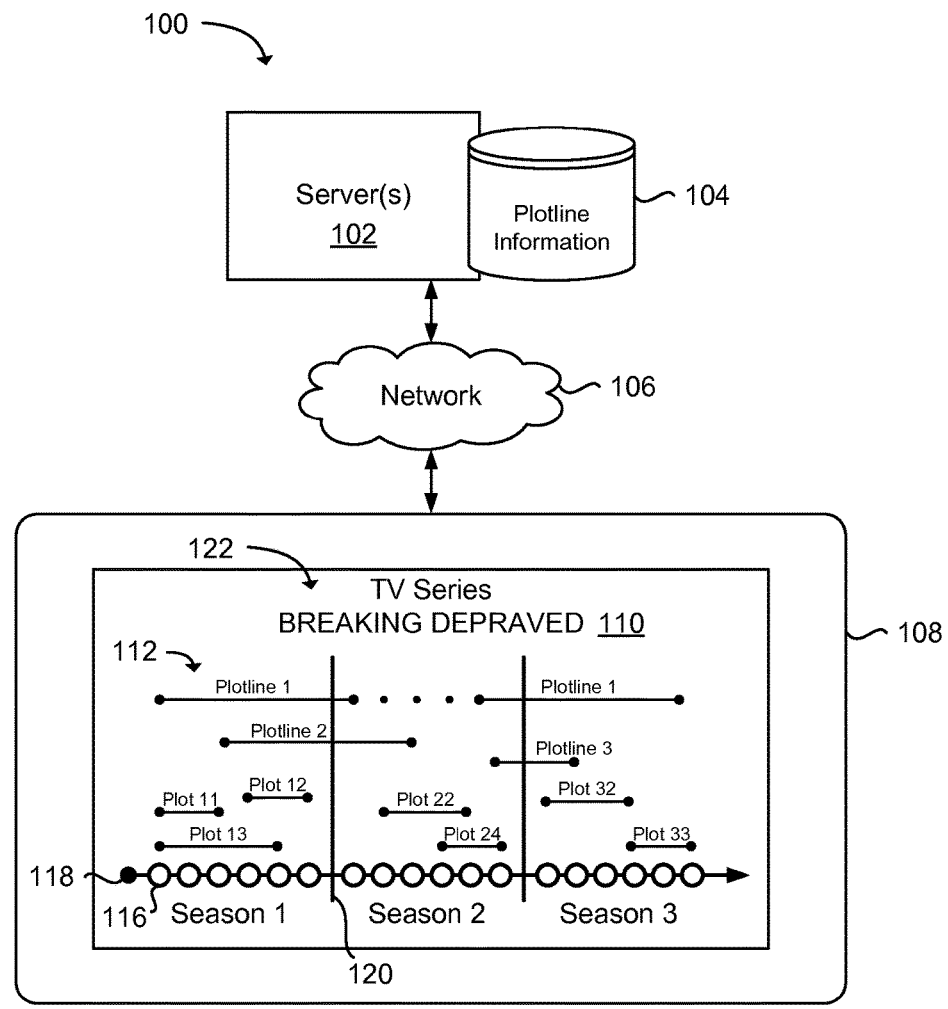
FIG. 1 is a diagram illustrating an example system for organizing and displaying plotline information associated with media content in a graphical visualization.

FIG. 1 is a diagram illustrating a high level example of a system 100 used for organizing and displaying plotline information associated with media content, such as a television program series, video series, movie series, book series, video game series, webisodes, etc. The system 100 may include one or more servers 102 that are in communication with a number of client devices 108 by way of a communications network 106 (e.g., the internet). A server 102 may have access to a data store 104 containing plotline information associated with various media content. Further, the server 102 may access and provide media content to a number of client devices 108. Illustrated is plotline information included in a data store 104 that may be associated with a plotline included in a television program series or like types of media content. Plotline information for a plotline may describe and/or identify various attributes of the plotline. As an example, plotline information may identify media content in which the plotline is featured (e.g., a title of a television program, movie, book, etc.), may include a label describing the plotline, and may identify seasons, episodes, chapters, sections events, etc. of the media content in which the plotline is featured.

A customer may make a request to view plotline information for plotlines included in media content (e.g., a video program series) using a client device 108. For example, via a user interface, a customer may input a media content title (e.g., television program title, video program title, electronic book title or audio book title) for which the customer would like to view plotline information. The request may then be transmitted to a server 102 where plotline information associated with the title may be identified and retrieved from a data store 104 along with media content information (e.g., video program series information) for the title. Generally, a narrative of a media work is likely to include a number of plotlines. For instance a narrative may include a main plotline and a plurality of sub plotlines. Plotline information for each plotline featured in the media content may be retrieved from the data store 104 and a plotline graphic 122 may be generated and provided to the client device 108.

In one example configuration, a plotline graphic 122 may display a timeline 118 for media content. The timeline 118 may include visual representations corresponding to demarcations within the media content, such as seasons, episodes, chapters, sections or events. For example, as illustrated a plotline graphic 122 may be generated for a television program series 110 that includes visual representations of episodes 116 and seasons 120. The visual representations used to depict timeline demarcations, plotlines and other information associated with the media content in FIG. 1 are merely one example of visual representations that may be used within a plotline graphic 122. Any type of visual representation used within a plotline graphic 122 is within the scope of this disclosure.

Plotline information 112 for plotlines featured in the media content may be displayed within the timeline 118 so that the plotline information 112 corresponds to seasons, episodes, chapters, sections or events in which an associated plotline is featured. For example, based on the example above where a plotline graphic 122 may be generated for a television program series 110 that includes visual representations of episodes 116 and seasons 120, plotline information 112 for a plotline may be displayed as corresponding to a single episode, spanning multiple episodes or spanning multiple seasons. As a result, a customer viewing the plotline graphic 122 may determine which seasons, episodes, chapters, sections, events, etc. feature a particular plotline and may determine when a particular plotline begins and ends.

In one example configuration, a plotline graphic 122 may include media content playback controls associated with plotline information 112 displayed within a timeline 118. The playback controls (e.g., a plotline link, a media player control, etc.), when selected, may allow a customer to view media content via a media player associated with the plotline information 112. For example, a customer may view full episodes featuring a plotline in sequential order, or may view media content segments in which the plotline is featured in sequential order, or may have the option to view a recap of previous episodes (e.g., a 30 second summary of a plotline). Media content for a plotline may, in one example, be navigated so that when the end of an episode, chapter, section, etc. is encountered, a subsequent episode with that plotline may be loaded into a media player and navigation may resume. Media content playback for plotlines included in a plotline graphic 122 are described in greater detail in relation to FIG. 5.

Due to the ability for customers to consume media content on demand, many customers may consume media content sometime after the media content has been released. For example, customers may consume media content after a television program has aired, a movie has been released or after a subsequent book in a series has been published. Accordingly, viewing a plotline graphic 122 of a media content that includes plotline information for every season, episode, chapter, section or event included in a media content series may result in revealing (e.g., spoiling) parts of the media content that a customer has not yet consumed. In order to avoid revealing plotline information featured in media content that a customer has not yet consumed, a customer's media consumption history may be referenced to determine what media content the customer has consumed. Based on the customer's media consumption history, plotline information retrieved may be limited to those seasons, episodes, chapters, sections or events that the customer has consumed. Thus, a plotline graphic 122 may display plotline information for media content that the customer has already consumed.

In one example configuration, plotline information 112 represented within a timeline 118 may include a label containing a title or description of the plotline. As described earlier, the title or description may be included in the plotline information retrieved from a data store 104. The label may provide certain information about an associated plotline. Information included in the label may be a general description of a plotline or may provide details about the plotline. For example, the label may be a general description of a plotline, such as "Conflict arises between two close friends" or the label may be a more specific description of a plotline, such as "An argument over a boy ends Tayler and Haley's friendship". In one example, a level of detail included in a label may be determined by a customer's media content history and the portions of the media content already consumed.

In another example configuration, plotline information 112 may be received from a customer and a graphical visualization (e.g., a plotline graphic 122) may be generated from the customer submitted plotline information. For example, a customer may identify a plotline featured in the narrative of media content. The customer may then provide plotline information 112 for the plotline and submit the plotline information 112 to a server 102. In one example, the plotline information 112 may be stored and made available to other customers. As an illustration, a customer may identify a plotline included in a narrative that spans multiple media content types. For example, the plotline may begin in a movie and then may span to a television program series, and then branch out to a comic book series. The customer may document the plotline and then provide the plotline information to the server 102. Using the plotline information 112, a plotline graphic 122 may then be generated and provided to the customer.

Figure 2:
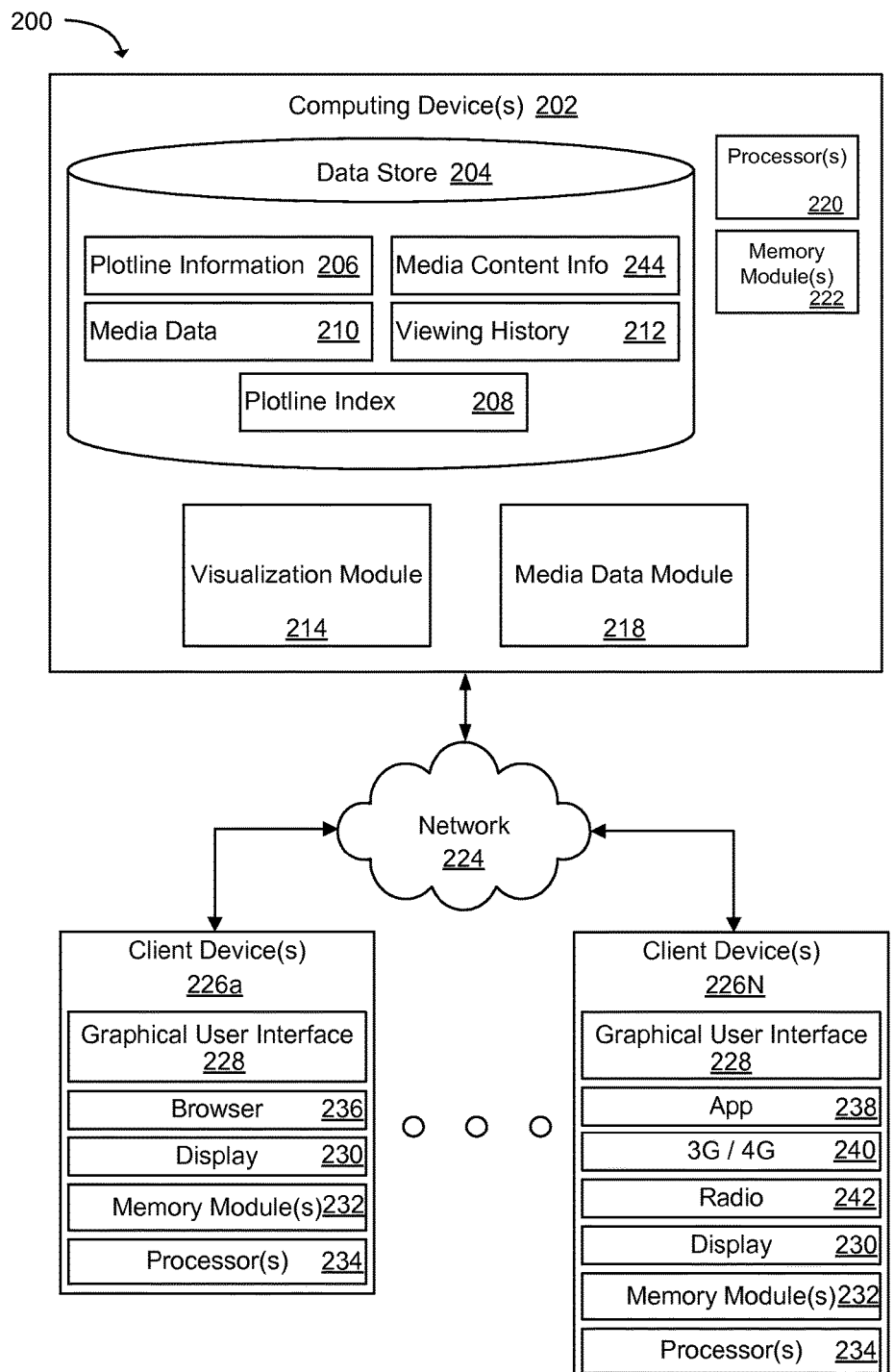
FIG. 2 is a block diagram illustrating example components of a system for organizing and displaying plotline information associated with media content.

FIG. 2 illustrates an example of various components of a system 200 on which the present technology may be executed. In one example configuration, the system 200 may include a computing device 202 that may be in communication with a number of client devices 226a-n by way of a communications network 224. The computing device 202 may include a data store 204, and a number of computing modules. For example, the computing device 202 may include a visualization module 214, a media data module 218, as well as other services, processes, systems, engines, or functionality not discussed in detail herein.

The visualization module 214 may be used to create a graphical visualization, such as a plotline graphic for media content by generating a timeline for the media content and inserting plotline information 206 within the timeline. The graphical visualization may then be provided to a client device 226a-n upon which the graphical visualization may be displayed. In one example configuration, the visualization module 214 may receive a request from a client device 226a-n for a graphical visualization. The request may include one or more parameters. For example, one parameter may contain a title that identifies media content. The visualization module 214 may query a data store 204 for plotline information 206 associated with the media content specified by the parameter. Plotline information 206 may be information for plotlines featured in a media content title. For example, plotline information 206 may include titles of plotlines, timeline locations that specify where in timeline various plotlines occur in media content (e.g., a beginning episode and an ending episode), plotline details (e.g., a summary of a plotline), as well as other plotline information related to a media content title.

Plotline information 206 obtained from the data store 204 may then be organized according to details included in the plotline information 206 and arranged within a media content timeline. For example, plotline details included in the plotline information 206 may be referenced to determine which seasons, episodes, chapters, sections or events a particular plotline is associated with. As a specific example, plotline details for a plotline may specify that the plotline is associated with a first season and part of a second season of a television program series, as well as specify episodes of the first season and the second season in which the plotline is featured. Based on the plotline details included in the plotline information 206, graphical representations may be placed within a timeline showing which seasons, episodes, chapters, sections or events a plotline is featured. Also, media content information 244 for the media content may be identified and displayed with the graphical visualization. The media content information 244 may include information that identifies and describes the media content. For example, media content information 244 may include a media content title, season titles, episode titles, a number of seasons for the media content, a number of episodes within a season for the media content, as well as other information related to the media content.

Illustratively, a graphical visualization may be generated for a media content series or may be generated for a sub-portion of a series. For example, a graphical visualization may display plotline information 206 for a single episode, chapter, season, etc. or may display plotline information 206 for an entire series. In one example, a parameter included in a request sent to the visualization module 214 may specify a level of granularity in which to display the plotline information 206. For instance, a parameter included in a request may specify an episode level of plotline information granularity, a season level of plotline information 206 granularity, or a series level of plotline information 206 granularity to be included in a graphical visualization.

In one example configuration, a customer's viewing history 212 may be referenced to determine a level of granularity in which to display plotline information 206 within a graphical visualization. More specifically, viewing history 212 may be used to determine whether to display plotline information 206 for media content not yet consumed by a customer. For instance, plotline information 206 included in a graphical visualization for a series may be limited to those episodes viewed by a customer. Further, plotline information 206 included in labels for a plotline may be determined based on viewing history 212 for a customer, as described in greater detail in relation to FIG. 4.

In another example, viewing history 212 may be used to determine a level of series granularity to display within a graphical visualization. For example, viewing history 212 may determine whether to display a timeline for an entire series or to limit a timeline to a particular number of seasons or episodes. As a specific example, where viewing history 212 for a customer may show that the customer has viewed one episode of a television program series, a timeline displayed in a graphical visualization may be limited to the single episode viewed by the customer. As another specific example, where viewing history 212 for a customer indicates that the customer has viewed several seasons of a television program series, a timeline displayed may be for the seasons of the television program series viewed by the customer.

In some example configurations, a graphical visualization may include one or more controls used to play media content for a plotline displayed in the graphical visualization. A media data module 218 may be used to respond to requests to play media content for a plotline. In one example, the media data module 218 may receive a request for media data 210 corresponding to a plotline for playback on a media player. Media data 210 corresponding to the plotline may be identified by querying a plotline index 208. The plotline index 208 may identify media data blocks containing media data 210 corresponding to plotlines, or may contain time indexes to media data 210 corresponding to plotlines. Having obtained media data block information for a plotline or time indexes corresponding to a plotline from the plotline index 208, the media data 210 may be retrieved from the data store 204 and played using a media player.

In addition, the media data module 218 in some example configurations may facilitate navigation of media data 210 associated with a plotline by treating disjoint media data 210 segments for a plotline as a single media data file. In other words, because media data 210 associated with a plotline may not be continuous, (e.g., a plotline may be featured in various episodes interspersed with other plotline material) navigating a plotline may involve navigating to an end of one episode and then having to load a subsequent episode. In order to avoid having to select and load a subsequent episode when a first episode has ended, the media data module 218 may be used to join episodes so that navigation between a first episode and a second episode may be continuous.

In one example configuration, the media data module 218 may retrieve media data 210 for a plotline that spans multiple seasons, episodes, chapters, sections, events, etc. The media data 210 may be separate media files, such as various episodes featuring a plotline. The media files may be joined so that the media files are arranged in a chronological order to create a single media file. As a result, when navigating the media data 210, the plotline may be navigated without having to load a subsequent episode when a current episode ends. In another example configuration, rather than retrieving entire episodes, chapters, etc. for a plotline and joining respective media files, the media data module 218 may retrieve a portion of an episode, chapter, etc. that features a plotline. Namely, media data 210 may be identified via a plotline index 208, such that episodes featuring a plotline may be trimmed by retrieving the specific portion of a media file (e.g., an episode) that features the plotline. The media data 210 retrieved may then be joined resulting in continuous navigation between the various portions of episodes featuring the plotline.

A client device 226a-N used by a customer to interact with a plotline graphical visualization may include any device capable of sending and receiving data over a communications network 224. A client device 226a-N may comprise, for example a processor-based system such as a computing device. Such a computing device may contain one or more processors 234, one or more memory modules 232 and a graphical user interface 228. A client device 226a-N may be a device such as, but not limited to, a desktop computer, laptop or notebook computer, tablet computer, handheld computer, smartphone, or other devices with like capability. The client device 226a-N may have one or more applications 238 installed on the client device 226a-N used to access plotline information 206. Also, a client device 226a-N may include a browser 236 that may enable the client device 226a-N to display a plotline graphical visualization within an electronic page (e.g., a web page). A client device 226a-N may contain hardware that may enable the client device 226a-N to connect to a communications network 224 using mobile communication protocols such as 3G, 4G and/or Long-Term Evolution (LTE) 240. Additionally, a client device 226a-N may contain a radio 242 that enables the client device 226a-N to connect to a communications network 224 by way of a wireless local area network connection such as WI-FI or Bluetooth®. The client device 226a-N may include a display 230, such as a liquid crystal display (LCD) screen, gas plasma-based flat panel display, LCD projector, cathode ray tube (CRT), or other types of display devices, etc. The display 230 may include a touchscreen (e.g., an interactive visual display) enabling a user to interact with a graphical visualization of plotline information.

The various processes and/or other functionality contained on the computing device 202 may be executed on one or more processors 220 that are in communication with one or more memory modules 222 according to various examples. The computing device 202 may comprise, for example, of a server or any other system providing computing capability. Alternatively, a number of computing devices 202 may be employed that are arranged, for example, in one or more server banks or computer banks or other arrangements. For purposes of convenience, the computing device 202 is referred to in the singular. However, it is understood that a plurality of computing devices 202 may be employed in the various arrangements as described above.

Various data may be stored in a data store 204 that is accessible to the computing device 202. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 204 may include storage systems such as a SAN (Storage Area Network), cloud storage network, volatile or non-volatile RAM, optical media, or hard-drive type media. The data store 204 may be representative of a plurality of data stores 204 as can be appreciated.

The communications network 224 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An application program interface (API) may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
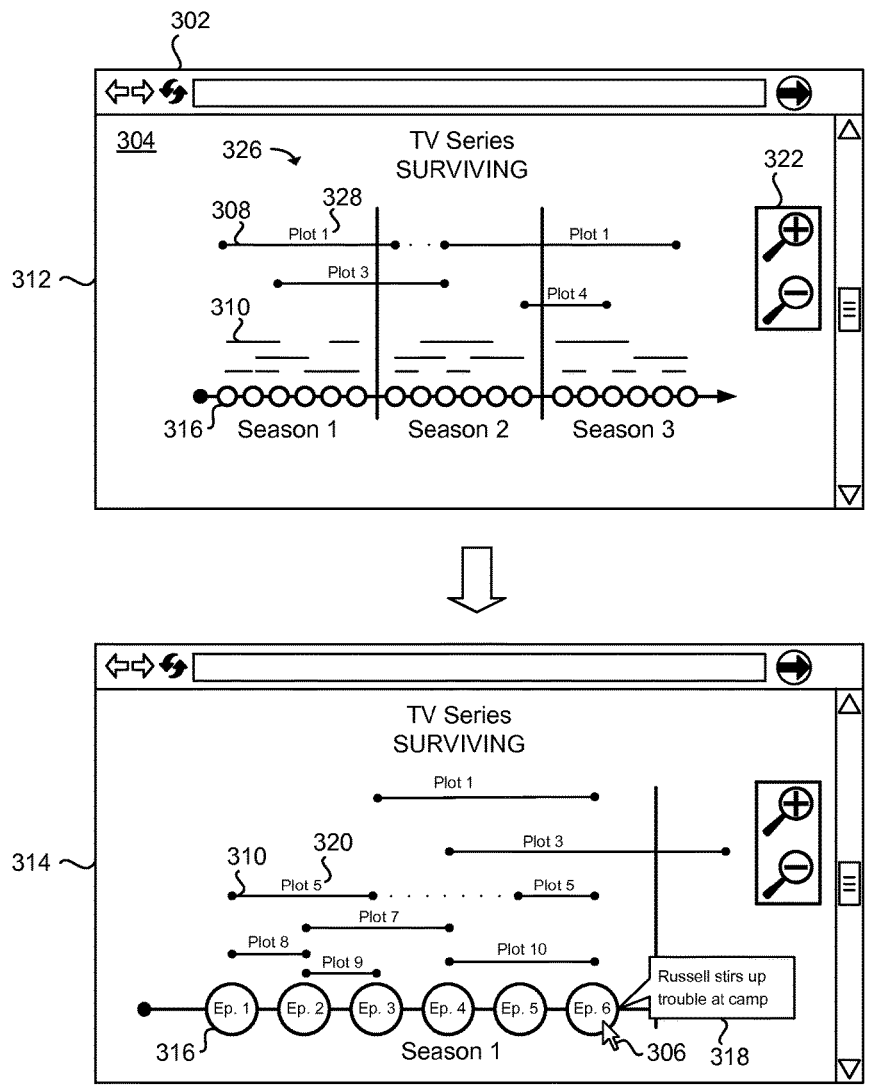
FIG. 3 is a diagram that illustrates an example of interactive features that may be included in a graphical visualization.

FIG. 3 is a diagram illustrating an example of a browser 302 displaying an electronic page 304 containing an interactive graphical visualization 326 for plotline information for a television program series. As illustrated, the electronic page 304 may be rendered using a browser 302, or alternatively may be rendered via an application included on a client device. FIG. 3 illustrates example interactive features that may be included in a graphical visualization 326. In one example configuration, an interactive graphical visualization 326 for plotline information may allow a customer to manipulate various features of the graphical visualization 326 via an input device (e.g., a client device). A customer may interact with a graphical visualization 326 by way of a touchscreen that allows the customer to select various controls and manipulate the graphical visualization 326 via a single or multi-touch gesture using one or more fingers and/or a stylus. Alternatively, a customer may interact with a graphical visualization 326 using a pointing device, such as a mouse.

One example interactive feature that may be included in a graphical visualization 326 for plotline information may be a zoom feature that allows a customer via an input device to expand the size of the graphical visualization 326 (i.e., zoom in), enlarging the graphical visualization 326 within an electronic page 304, as well as to reduce the size of the graphical visualization 326 (i.e., zoom out). Zooming in may cause a graphical visualization 326 to be displayed at a high resolution 314 as compared to a default resolution 312, and zooming out may cause the graphical visualization 326 to be returned to the default resolution 312, or to be displayed at a lower resolution as compared to a default resolution 312. A zoom control 322 may be included in an electronic page 304 displaying a graphical visualization 326. Selecting the zoom control 322 using a touchscreen or pointing device may cause a graphical visualization 326 to be displayed at a high or low resolution according to a respective feature of the zoom control 322 selected.

Displaying a graphical visualization 326 at a high resolution 314 may result in displaying plotline information shown in the graphical visualization 326 at a fine level of granularity as compared to a default resolution 312. For example, at a default resolution 312, a graphical visualization 326 may display labels at a default resolution 312 for some plotlines, but may not show labels for other plotlines at the default resolution 312. Increasing the resolution of a graphical visualization 326 may increase the level of plotline information granularity displayed in the graphical visualization 326. As a specific example, as illustrated in FIG. 3, a label 328 associated with a plotline 308 that spans more than one season of a television program series may be shown at a default resolution 312, whereas a label for a plotline 310 that does not span more than one season may not be shown at a default resolution 312. Displaying the graphical visualization 326 at a high resolution 314 may result in displaying a label 320 for the plotline 310 that does not span more than one season. As another specific example, an episode 316 at a default resolution 312 may not include a label that identifies the episode 316, whereas at a high resolution 314, the episode may include a label identifying the episode. Zooming out may cause an interactive graphical visualization 326 to be displayed at a default resolution 312, or at a low resolution and may result in plotline information being shown at a coarse level of granularity. For example, labels associated with various plotlines may not be shown at a coarse level of granularity as described above.

Another interactive feature that may be included in a graphical visualization 326 for plotline information may be an information popup feature (e.g., mouseover, mouse hover, touch, long touch) that when activated, displays plotline information that may not be otherwise displayed within the graphical visualization 326. FIG. 3 illustrates one specific example of an information popup feature where a customer using a pointing device may position a cursor 306 on a representative episode in a timeline, whereupon a popup box 318 containing plotline information included in the episode may be displayed.

Figure 4:
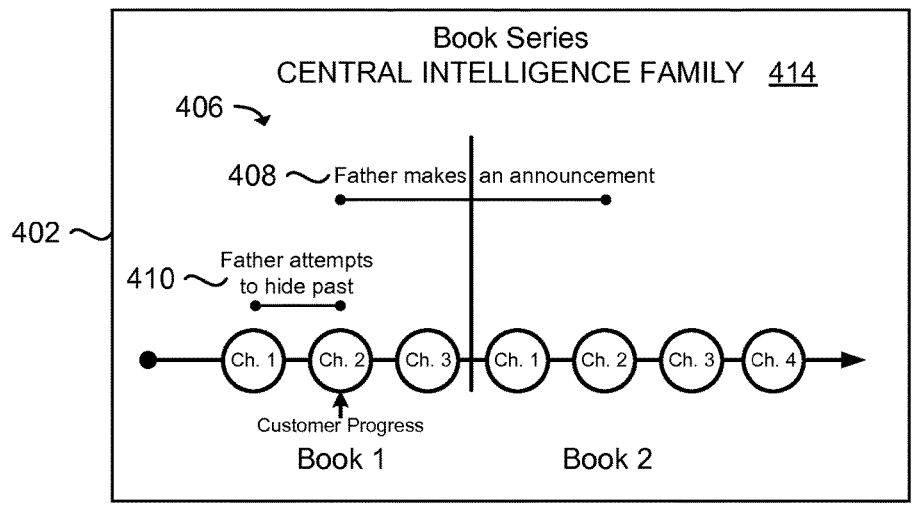
FIG. 4 is a diagram illustrating an example for displaying plotline information within a graphical visualization according to a customer's media content history.
Figure 4:
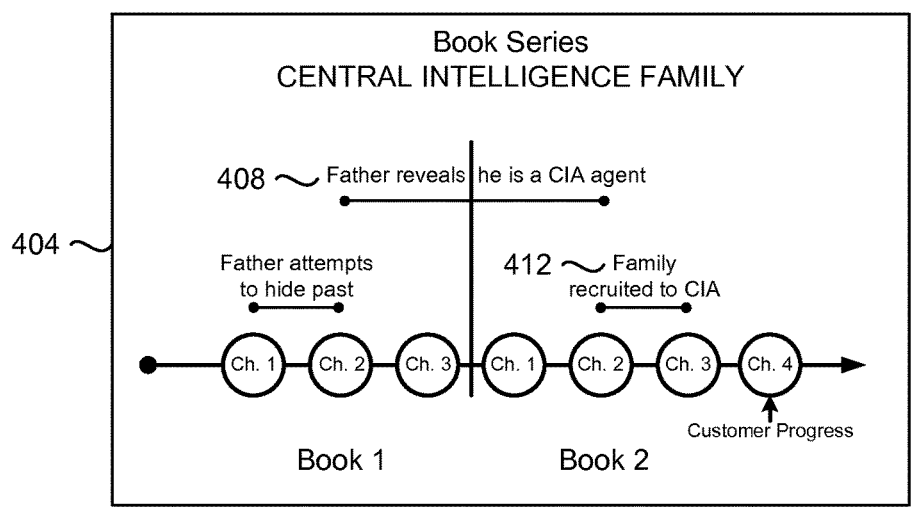

Moving now to FIG. 4, a diagram illustrates an example method for displaying plotline information within labels displayed in a graphical visualization according to a customer's respective viewing, reading or listening history. FIG. 4 shows a specific example of a graphical visualization 406 containing plotline information for a book series 414 (e.g., an audio book series or an electronic book series) that may be updated according to a customer's reading or listening history. In one example, a customer's history of consuming media content may be retrieved when a customer requests to view plotline information for the media content. For example, when a customer, via a user interface requests to view plotline information for a book series 414, the customer's stored reading history for the book series 414 may be retrieved from a data store. Alternatively, a customer may provide the customer's media content history by specifying a furthest point in a series that a customer has viewed, read or listened. For example, a customer may specify a chapter of a book in a book series 414 that the customer last read.

As illustrated in 402, based on a customer's history, a graphical visualization 406 may be generated that includes labels 408 and 410 associated with plotlines featured in a book series 414. The information presented in the labels 408 and 410 may reflect the customer's progress in reading the book series 414. For example, the information provided in the label 408 may provide information that identifies an associated plotline spanning chapters or books not yet read by a customer without providing information that will be revealed later in the chapters or books. Whereas information provided in the label 410 may provide a comprehensive description of an associated plotline that has been fully developed within the chapters read by the customer.

As illustrated in 404, plotline information within a graphical visualization 406 may reflect a customer's progress in reading, listening or viewing a media content series based on the customer's media content history. For instance, when a customer has finished reading chapters in which a plotline has been fully developed, the label 408 may be updated from providing a general description of the plotline to providing a comprehensive description of the plotline. In addition, as a customer makes progress in reading the book series 414, additional labels 412 associated with plotlines featured in the chapters and/or books read may be displayed within the graphical visualization 406 according to the customer's history. Illustratively, when a customer moves on to a second book in the books series 414, plotlines and associated labels 412 may be included in the graphical visualization 406.

Figure 5:
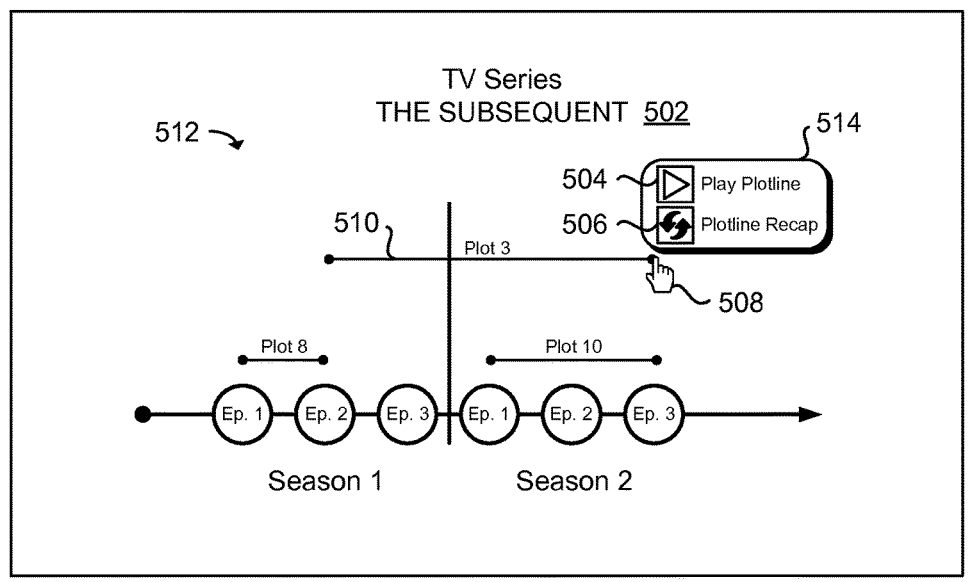
FIG. 5 is a diagram that illustrates an example for playing media content associated with a plotline by selecting user interface controls included in a graphical visualization.

FIG. 5 is a diagram illustrating one example method for playing media content associated with a plotline. In one example configuration, a graphical visualization 512 that includes plotline information for a media content series, such as a television program series 502, may include a user interface control 504 (e.g., a play control) that may be associated with a plotline 510 displayed in the graphical visualization 512. Illustratively, a user interface control 504 may be accessed via a popup feature included in a graphical visualization 512, such as a popup box 514. For example, using a touchscreen or a pointing device, a customer may select 508 a plotline 510 for which associated media content is to be played and a popup box containing the user interface control 504 may be displayed. In another example, a user interface control 504 may be embedded in a graphical visualization 512, such that the user interface control 504 may be displayed near an associated plotline 510.

Selecting a user interface control 504 may cause media data associated with the plotline 510 to be retrieved from a data store and played using a media player. In one example, media files for episodes in which the plotline 510 is featured may be retrieved and played in chronological order. In another example, segments of media files for episodes featuring the plotline 510 may be retrieved from a data store and played in chronological order.

In another example configuration, a graphical visualization 512 may include a recap user interface control 506 that may be associated with a plotline 510 displayed in the graphical visualization 512. Illustratively, the recap user interface control 506 may be accessed via a popup feature included in a graphical visualization 512, such as a popup box 514 as described above or may be included in a graphical visualization 512 near an associated plotline 510. Selecting the recap user interface control 506 may cause a recap or a summary of an associated plotline 510 to be played via a media player. For example, a recap (e.g., a 30 second, 45 second or 60 second summary) may be a compilation of media data segments that provide an overview of an associated plotline 510. In one example, a recap may provide a summary for a plotline for all episodes in which the plotline is featured. In another example, a recap may provide a summary of a plotline for the last episode viewed by a customer. In addition, media content included in a recap may be compiled based on a customer's viewing history so as not to reveal (e.g., spoil) plotline information not yet viewed by the customer.

Figure 6:
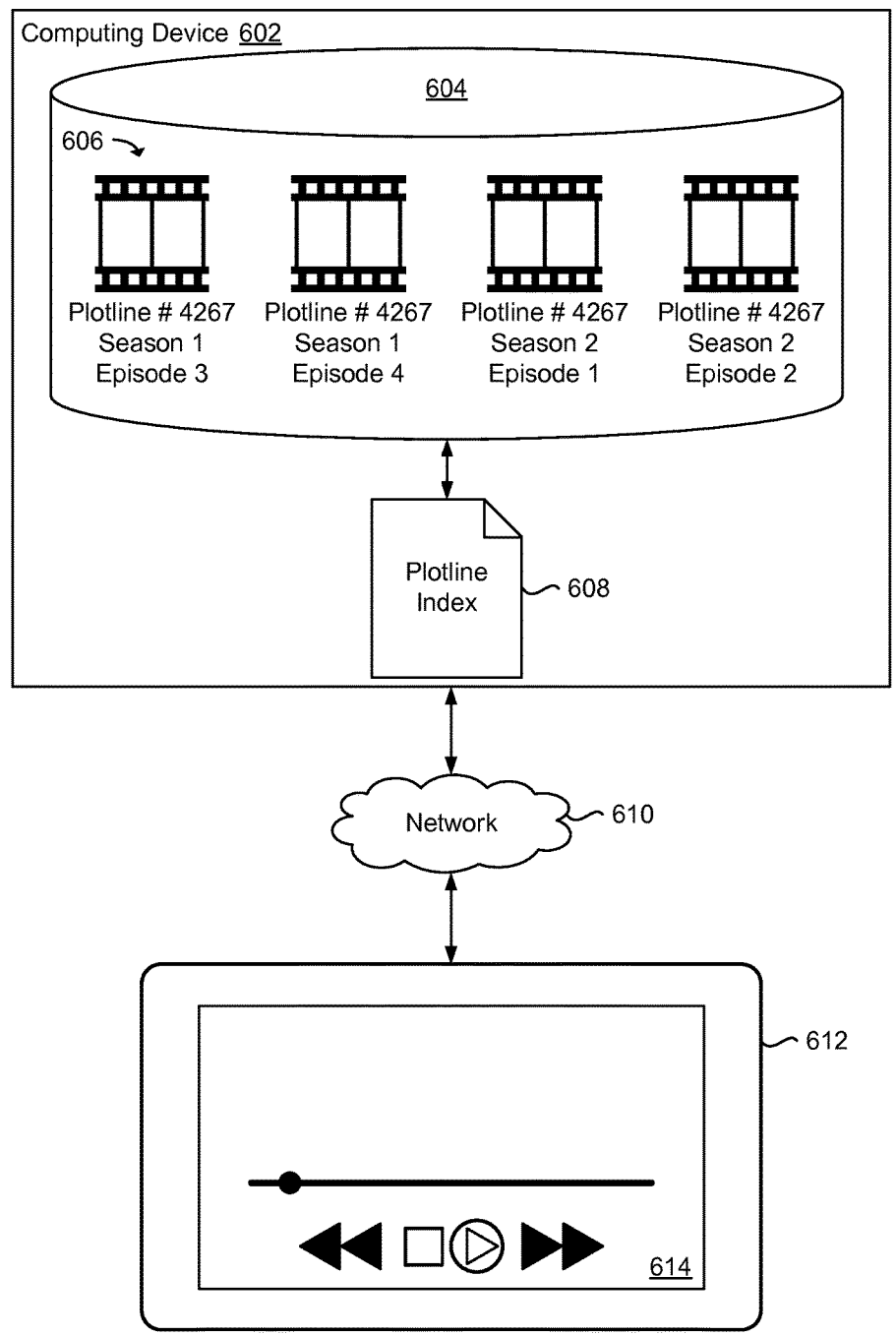
FIG. 6 is a diagram illustrating an example for retrieving media content corresponding to a plotline and playing the media content via a media player.

FIG. 6 is a diagram illustrating an example method for retrieving media data 606 corresponding to a plotline from a data store 604 and providing the media data 606 to a client device 612 where the media data 606 may be played using a media player 614. In one example configuration, upon selecting a plotline for which media content is to be played, an API request may be sent to a computing device 602 for media data 606 corresponding to the plotline. Upon receiving the API request, a computing service executing on the computing device 602 may locate the media data 606 in a data store 604 by referencing a plotline index 608.

In one example, a plotline index 608 may contain references to media data block locations within a data store 604 where media data 606 for a plotline may be stored. Illustratively, one or more media data blocks may contain a segment of an episode included in a series featuring a plotline. Media data blocks may be identified for segments of multiple episodes that comprise the plotline. As an illustration, where a plotline may be featured in several episodes included in various seasons of a series, media blocks may be identified, via a plotline index 608, for each segment of the episodes in which the plotline is featured. The media blocks may then be provided to a requesting client device 612 over a communications network 610.

In another example, a plotline index 608 may reference media data 606 using time indexes. A time index may reference a segment of an episode where a plotline is featured. For example, a beginning time index may reference a point in an episode in which a plotline narrative begins, and an ending time index may reference a point in the episode where the plotline narrative ends. Using a time index, media data 606 for a plotline may be identified. For example, the media data 606 may include metadata headers containing time indexes that can be used to identify media data 606 corresponding to a plotline. Media data 606 identified may then be provided to a requesting client device 612. Further, portions of media data 606 containing title sequences, opening credits, closing credits, last episode recaps, commercial break recaps and the like may be excluded from media data 606 and/or plotline using the plotline index 608 to identify the portions of the media data 606 so that the portions are not included in the media data 606 provided to a requesting client device 612.

Media data 606 may be streamed to a client device 612 (e.g., transmitted over a computer network as a steady, continuous flow, allowing playback to proceed while subsequent media data 606 is being received by the client device 612). In one example, media data 606 corresponding to an episode may be retrieved from a data store 604 in chronological order and streamed to a client device 612, where a first set of media data may be retrieved and transmitted to the client device 612, and then a subsequent set of media data may be retrieved and transmitted. In another example, media data 606 for a plotline spanning multiple seasons, episodes, chapters, sections or events may be retrieved from a data store 604, arranged in chronological order and joined to create a single media stream, which may then be streamed to a client device 612. In yet another example, media data 606 associated with a plotline may be buffered on a client device 612 allowing for navigation of the media data 606 to be uninterrupted between episodes, chapters or sections included in the media content. For example, a client device 612 may request a first episode featuring a plotline from a computing device 602 with the media data 606. After buffering the first episode, the client device 612 may then request a second episode featuring the plotline. As a result, playback of the media data 606 may be uninterrupted between the first episode and the second episode.

Figure 7:
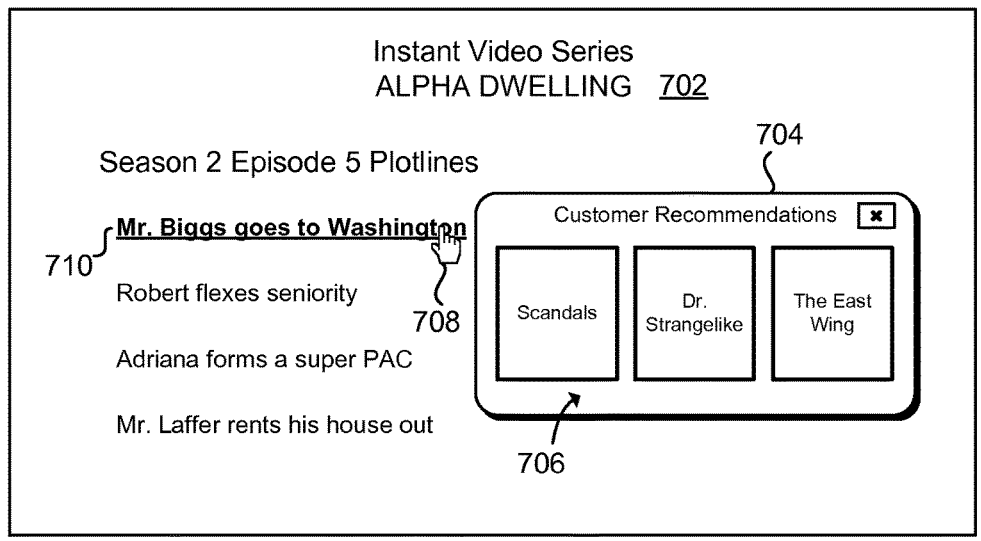
FIG. 7 is a diagram illustrating an example for providing recommendations to a customer for media content related to a plotline.

FIG. 7 is a diagram illustrating an example method for providing recommendations to a customer for media content related to a plotline listing. Generally, plotlines featured in one form of media content, such as a television program, video, movie, book, etc. may be featured in some other form of media content. For example, a romantic plotline, a deceptive plotline or a conflict based plotline may be featured in various forms of media content. As a specific example, a romantic plotline may be featured in a book series and in a television program series. As a result, plotlines contained in content media may be identified, categorized and cross-referenced with other content media. Customers may then be presented with recommendations for media content that includes a related plotline. As an illustration, a customer viewing plotline information included in a television program series may be presented with recommendations for various other television programs, videos, movies or books that feature plotlines similar to that included in the television program series.

As illustrated in FIG. 7, a listing of plotlines featured in an episode of an instant video series 702 may be provided to a customer via a graphical user interface. The listing of plotlines within the graphical user interface may be interactive, such that a customer may select 708 a plotline listing 710 using a touchscreen or pointer device. Selecting 708 a plotline listing 710, among other actions, may cause one or more recommendations for media content 706 related to the plotline listing 710 to be displayed. For example, a popup box 704 may be displayed containing a number of recommendations for media content 706 (e.g., other titles or plotlines), from which a customer may select a recommendation to view, add to a wish list, add to a play queue, etc.

Figure 8:
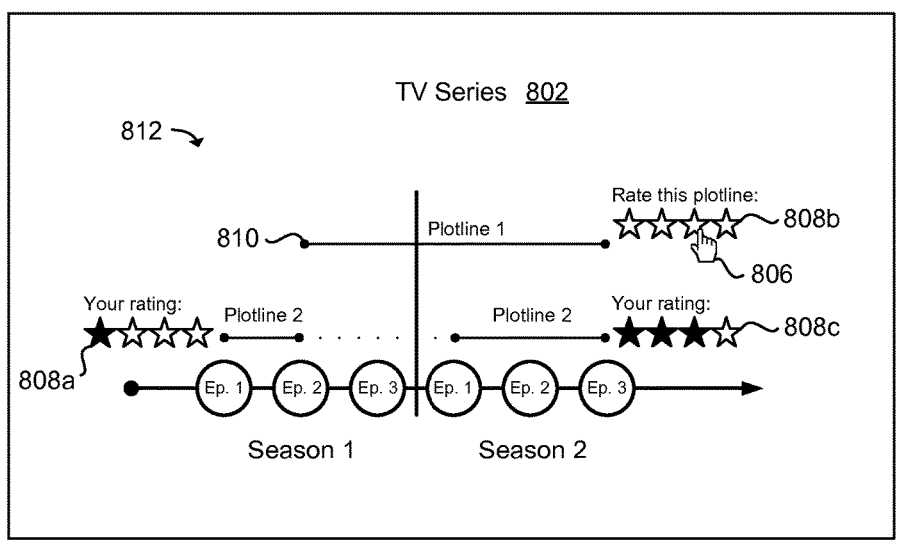
FIG. 8 is a diagram illustrating an example of rating a plotline featured in media content.

FIG. 8 is a diagram that illustrates an example method for rating a plotline featured in media content. By rating a plotline, a customer may indicate whether the customer likes or dislikes a particular plotline or a general category of plotlines. A customer rating for a plotline may be used by a media content provider to identify plotlines similar to the rated plotline in order to recommend or exclude plotline suggestions based on the value of a rating. For example, a content provider may recommend plotlines to a customer that are similar to a plotline that a customer has given a high rating, and may exclude plotlines from recommendations that are similar to plotlines rated low by the customer.

Illustrated in FIG. 8 is one example of a graphical visualization 812 for a television program series 802 that may include rating controls 808a-c used to capture a rating value for a plotline. For example, a rating control 808a-c may be an input control displaying a number of stars that a customer, using a touchscreen or pointing device, may select 806 to indicate a star rating value (e.g., a number of stars). Other methods may be used to rate a plotline, such as inputting a numerical rating value, selecting an indicator or label representing whether the customer likes or dislikes a plotline (e.g., a "thumbs up" or "thumbs down"), as well as other methods that may be used to rate a plotline. As illustrated, a customer may enter a rating value by selecting one or more stars of a rating control 808a-c to indicate a level of interest in the plotline.

After entering a rating for a plotline, a rating control 808a-c may display the rating entered by a customer. Thus, whenever a customer views a graphical visualization 812 for content media that includes plotline ratings provided by the customer, the rating controls 808a-c included in the graphical visualization 812 may display the ratings entered by the customer. Rating controls 808a-c for plotlines 810 that have not yet received a rating may be displayed as blank or empty (e.g., the stars may be unfilled). Further, a rating control 808a-c may include a text label indicating whether an associated plotline 810 has been rated by the customer (e.g., "Your Rating:").

Figure 9:
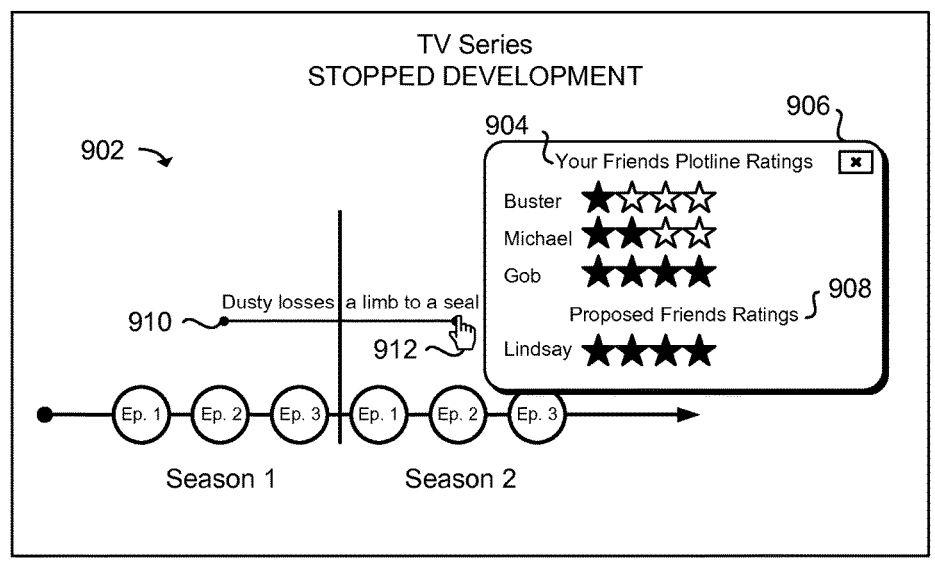
FIG. 9 is a diagram that illustrates an example of a graphical visualization that includes social networking features.

FIG. 9 is a diagram illustrating one example of a graphical visualization 902 that includes social networking features enabling a customer to view plotline ratings for associates 904 (e.g., friends, family, acquaintances) within the customer's social network, discover associates who have similar preferences in plotlines, as well as discovering potential associates 908 with similar plotline interests. In this example, a customer may select 912 a plotline 910 for which the customer would like to view social network information, whereupon a popup box 906 may be displayed that contains a listing of associates who have rated the plotline 910, as well as a list of suggested associates who rated the plotline 910. As will be appreciated, any method of connecting a customer with associates and proposed associates based on plotlines featured in a narrative work is within the scope this disclosure.

FIG. 10 is a diagram illustrating an example graphical user interface used to display a listing of favorite plotlines 1002 that a customer has selected as favorite plotlines. In one example, customers may add plotlines 1010 associated with media content to a listing of favorite plotlines 1002 via a user interface, whereupon the plotlines 1010 may be organized and displayed. For example, a listing of favorite plotlines 1002 may show a title 1004 of a televisions program series, video series, etc. and one or more plotlines 1010 associated with the title 1004 that a customer has selected as favorite plotlines. In addition, a listing of favorite plotlines 1002 may display rating values 1008 that a customer has assigned to a respective plotline. In various examples, customers may rearrange a hierarchy of favorite plotlines 1002, modify rating values 1008 of plotlines 1010, select a plotline 1010 to view, select a plotline 1010 to share with associates, find recommendations related to a selected plotline 1010, as well as other features that may be included in a listing of favorite plotlines 1002.

Figure 11:
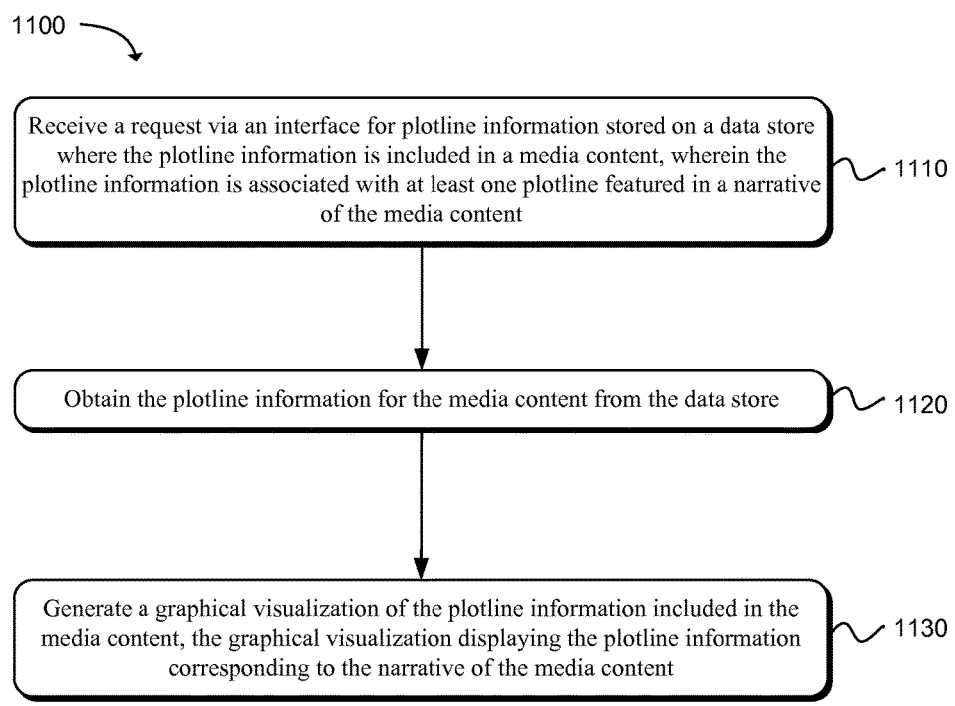
FIG. 11 is a flow diagram that illustrates an example method for generating a graphical visualization of plotline information included in media content.

FIG. 11 is a flow diagram illustrating an example method 1100 for generating a graphical visualization of plotline information included in media content, such as a narrative work. Beginning in block 1110, a request may be received via an interface for plotline information stored on a data store where the plotline information may be included in media content. The plotline information may be associated with at least one plotline featured in a narrative of the media content. As a specific example, plotline information may describe a number of plotlines featured in media content (e.g., television series, instant streaming video series, movie series, etc.) using a visual indicator showing a number of episodes, seasons, etc. that a plotline spans, as well as a label containing a title or description of a plotline.

As in block 1120, the plotline information may be obtained for the media content from the data store, and as in block 1130, a graphical visualization may be generated of the plotline information included in the media content, the graphical visualization displaying the plotline information corresponding to the narrative of the media content. In one example configuration, plotline information may be displayed within a timeline representing the progression of a narrative where the timeline may be segmented indicating seasons, episodes, chapters, sections or events within the narrative. As such, plotline information shown within the timeline may represent the progression of the plotline within the narrative, for example, by displaying the plotline information so that the plotline information spans across seasons, episodes, chapters, sections or events indicated within the timeline.

In one example, a graphical visualization may be interactive allowing a customer to manipulate the graphical visualization via an input device (e.g., touchscreen, pointing device, etc.) to navigate the graphical visualization. For example, a zoom feature may allow a customer via an input device to zoom in causing the graphical visualization to be displayed at a higher resolution that shows plotline information at a fine level of granularity as compared to a default resolution. Also, the zoom feature may allow a customer to zoom out causing the graphical visualization to be displayed at a lower resolution where plotline information may be shown at a coarse level of granularity as compared to a default resolution.

In one example, in order to avoid revealing plotline information included in media content not yet viewed by a customer, plotline information for media content may be filtered based on the customer's media content history to exclude plotline information not yet viewed or read by the customer. In another example, plotline information may be filtered based on a parameter provided by a customer. For example, a customer may provide a viewing history parameter specifying a location in a media content series up to where the customer has viewed (e.g., a season and episode in a television program series).

A graphical visualization may include a user interface control associated with a plotline that when selected causes media data associated for the plotline to be retrieved from a data store and played via a media player, as described earlier. Likewise, a graphical visualization may include a recap user interface control associated with a plotline that when selected causes a media file containing a summary of a plotline to be retrieved from a data store and played via a media player. Navigation of media data for a plotline may be performed so that when an end or a beginning of an episode, chapter or section is encountered, media data for a subsequent episode, chapter or section may be loaded into the media player and navigation of the media data may be resumed.

Figure 12:
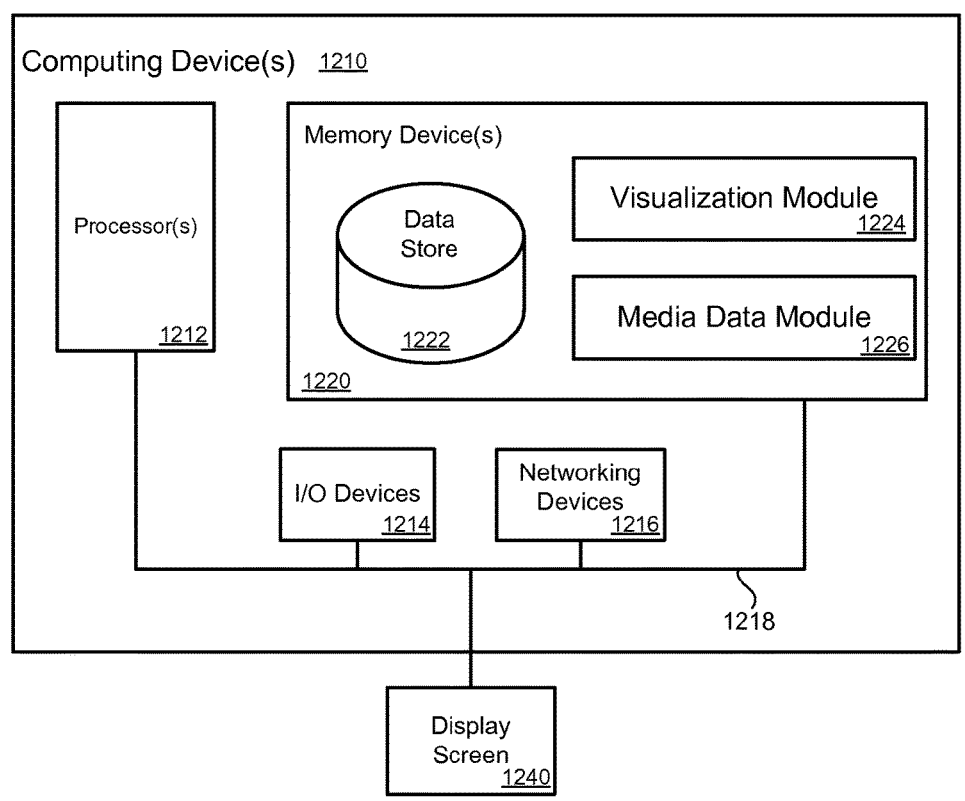
FIG. 12 is block diagram illustrating an example of a computing device that may be used to execute a method for generating a graphical visualization of plotline information included in media content.

FIG. 12 illustrates a computing device 1210 on which modules of this technology may execute. The computing device 1210 may include one or more processors 1212 that are in communication with memory devices 1220. The computing device 1210 may include a local communication interface 1218 for the components in the computing device. For example, the local communication interface 1218 may be a local data bus and/or any related address or control busses as may be desired.

The memory device 1220 may contain modules that are executable by the processor(s) 1212 and data for the modules. Located in the memory device 1220 are services and modules executable by the processor. For example, a visualization module 1224, media data module 1226 and other modules may be located in the memory device 1220. The modules may execute the functions described earlier. A data store 1222 may also be located in the memory device 1220 for storing data related to the modules and other applications along with an operating system that is executable by the processor(s) 1212.

Other applications may also be stored in the memory device 1220 and may be executable by the processor(s) 1212. Components or modules discussed in this description that may be implemented in the form of software using high programming level languages that are compiled, interpreted or executed using a hybrid of the methods.

The computing device may also have access to I/O (input/output) devices 1214 that are usable by the computing devices. An example of an I/O device is a display screen 1240 that is available to display output from the computing devices. Other known I/O device may be used with the computing device as desired. Networking devices 1216 and similar communication devices may be included in the computing device. The networking devices 1216 may be wired or wireless networking devices that connect to the internet, a LAN, WAN, or other computing network.

The components or modules that are shown as being stored in the memory device 1220 may be executed by the processor(s) 1212. The term "executable" may mean a program file that is in a form that may be executed by a processor 1212. For example, a program in a higher level language may be compiled into machine code in a format that may be loaded into a random access portion of the memory device 1220 and executed by the processor 1212, or source code may be loaded by another executable program and interpreted to generate instructions in a random access portion of the memory to be executed by a processor. The executable program may be stored in any portion or component of the memory device 1220. For example, the memory device 1220 may be random access memory (RAM), read only memory (ROM), flash memory, a solid state drive, memory card, a hard drive, optical disk, floppy disk, magnetic tape, or any other memory components.

The processor 1212 may represent multiple processors and the memory 1220 may represent multiple memory units that operate in parallel to the processing circuits. This may provide parallel processing channels for the processes and data in the system. The local interface 1218 may be used as a network to facilitate communication between any of the multiple processors and multiple memories. The local interface 1218 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for plotline visualization, comprising:
   under control of one or more computer systems configured with executable instructions:
   receiving, via a graphical user interface provided over a network, a request for plotline information for a video program series, the plotline information having a plurality of plotlines featured in the video program series;

identifying plotline information in a data store containing plotline information for the video program series requested;

identifying video program series information associated with the video program series in the data store; and generating a plotline graphic containing the plotline information for the video program series, wherein the plotline graphic is configured to display the video program series as a timeline of episodes and seasons of the video program series, and the plotline information is configured to be displayed within the timeline as corresponding to episodes and seasons that include an associated plotline;

receiving, via the graphical user interface over the network, a playback request to playback segments from episodes of the video program series that corresponds with a plotline displayed in the plotline graphic, wherein the segments are arranged in chronological order to provide a progression of the plotline within a narrative of the video program series;

identifying a plotline index that provides references to media data blocks containing the segments of the episodes of the video program series that correspond with the plotline; and sending the media data blocks for playback in the graphical user interface in chronological order of the plotline.

2. A method as in claim 1, wherein generating the plotline graphic containing the plotline information, further comprises generating an interactive plotline graphic for the plotline information that a customer can manipulate via an input device to navigate the plotline graphic.

3. A method as in claim 1, further comprising:
generating an interactive plotline graphic for the plotline information that includes a zoom feature allowing a customer via an input device to:
zoom in causing the interactive plotline graphic to be displayed at a higher resolution showing plotline information at a fine level of granularity as compared to a default resolution; and
zoom out causing the interactive plotline graphic to be displayed at a lower resolution where plotline information is shown at a coarse level of granularity as compared to the default resolution.

4. A method as in claim 1, further comprising filtering plotline information for the video program series displayed on the plotline graphic to exclude plotline information using a customer's viewing history for the video program series.

5. A method as in claim 1, further comprising filtering plotline information for the video program series displayed on the plotline graphic using a viewing history parameter provided by a customer.

6. A computer implemented method, comprising:
under control of one or more computer systems configured with executable instructions,
receiving a request via an interface for plotline information stored on a data store where the plotline information is associated with media content, and wherein the plotline information includes a plurality of plotlines featured in a narrative of the media content;
identifying the plotline information for the media content in the data store;
generating a graphical visualization of the plotline information included in the media content, wherein the graphical visualization displays the plotline information corresponding to the narrative of the media content;
receiving a media content request via the interface requesting segments of the media content associated with a plotline selected from the plotline information displayed in the graphical visualization, wherein the segments are arranged in chronological order to provide a progression of the plotline within the narrative of the media content;
identifying a plotline index that provides references to the segments of the media content that correspond to the plotline; and
sending the segments of the media content to be displayed in the graphical visualization in chronological order of the plotline.

7. A method as in claim 6, wherein the graphical visualization includes a user interface control that is associated with displayed plotline information for the media content that when selected generates the media content request.

8. A method as in claim 6, wherein generating the graphical visualization further comprises generating a graphical visualization that includes a recap user interface control associated with displayed plotline information for the media content that when selected causes a media file containing a summary of the plotline to be retrieved from a data store and played via a media player.

9. A method as in claim 6, wherein generating the graphical visualization further comprises displaying the plotline information within a timeline representing the narrative of the media content where the timeline is segmented indicating seasons, episodes, chapters, sections or events within the narrative.

10. A method as in claim 6, wherein generating the graphical visualization further comprises displaying the plotline information within a timeline representing the narrative of the media content and displaying the plotline information within the timeline so that the plotline information spans across seasons, episodes, chapters, sections or events indicated within the timeline.

11. A method as in claim 6, further comprising buffering the segments of the media content that correspond to the plotline on a client device, allowing for navigation of the media content to be uninterrupted between episodes, chapters, or sections included in the media content.

12. A method as in claim 6, wherein generating the graphical visualization of the plotline information included in the media content further comprises generating a descriptive label for the plotline information based at least in part on a customer's viewing history of the media content to avoid revealing plotline information that is discovered later in the narrative but has not yet been viewed by the customer.

13. A method as in claim 6, further comprising creating the plotline index that identifies the segments of the media content stored in a data store corresponding to the plotline contained in the media content.

14. A method as in claim 6, wherein generating the graphical visualization of the plotline information further comprises generating a graphical visualization that includes user interface controls that when selected perform an action selected from at least one of: rating a plotline included in a media content, adding a plotline included in a media content to a favorites list or sharing a plotline to a social networking account.

15. A method as in claim 6, wherein receiving the request for plotline information included in media content further comprises receiving a request for plotline information selected from at least one of: a television program, a movie, a video, a book or an audio file.

16. A method as in claim 6, wherein the media content comprises a narrative that is divided into a plurality of seasons, episodes, chapters, sections or events.

17. A method as in claim 6, further comprising receiving from a customer plotline information for a plotline featured in media content and generating a graphical visualization of the plotline information.

18. A system, comprising:
   a processor;
   a data store for plotline information and media content information;
   a memory device including instructions that, when executed by the processor, cause the system to:
   receive requests via an interface for plotline information stored on the data store where the plotline information describes plots in a media content series, wherein the plotline information includes a plurality of plotlines featured in a narrative of the media content series;
   identify the plotline information for the media content series in the data store;
   identify media content information associated with the media content series in the data store;
   generate a plotline graphic using the media content information and the plotline information, the plotline graphic displaying the plotline information as the plurality of plotlines featured in the narrative of the media content series using a segmented timeline representing the media content series, the plotline graphic displaying the media content information associated with the media content series;
   receive a playback request via the interface to playback segments of the media content containing a plotline displayed in the plotline graphic, wherein the segments are arranged in chronological order to provide a progression of the plotline within the narrative of the media content;
   identify a plotline index that provides time indexes referencing segments of media content that feature the plotline; and
   sending the segments of the media content using the time indexes for playback in the plotline graphic in chronological order of the plotline.

19. A system as in claim 18, wherein the memory device includes instructions that, when executed by the processor, cause the system to playback the segments of the media content on a media player.

20. A system as in claim 19, wherein the memory device includes instructions that, when executed by the processor, causes the system to retrieve the segments of the media content for the plotline and join the segments of the media content to a single media stream for playback on the media player.

* * * * *